July 27, 1965  F. A. CHAPPELL  3,196,968
BALANCES PROVIDED WITH APPROXIMATE WEIGHING DEVICES
Filed Jan. 29, 1964  2 Sheets-Sheet 1

INVENTOR
FRANK ARTHUR CHAPPELL
BY Toulmin & Toulmin
ATTORNEYS

July 27, 1965  F. A. CHAPPELL  3,196,968
BALANCES PROVIDED WITH APPROXIMATE WEIGHING DEVICES
Filed Jan. 29, 1964  2 Sheets-Sheet 2

INVENTOR
FRANK ARTHUR CHAPPELL
BY
Toulmin & Toulmin
ATTORNEYS 3,196,968
BALANCES PROVIDED WITH APPROXIMATE WEIGHING DEVICES
Frank A. Chappell, Petts Wood, Kent, England, assignor to L. Oertling Limited, Orpington, Kent, England, a British company
Filed Jan. 29, 1964, Ser. No. 341,018
5 Claims. (Cl. 177—243)

This invention relates to balances provided with approximate weighing devices and with a preselection system of weight loading, and has for its object to provide for the automatic selection during the approximate weighing operation of weights which will substantially balance the article being weighed.

According to the present invention, in a balance provided with an approximate weighing device and with a preselection system of weight loading, a member displaced during approximate weighing in proportion to the out-of-balance load determines, by its position after such displacement, the movement of a weight-selecting device so as to effect a selection of weights such that the balance beam is substantially balanced when released for fine weighing.

Preferably, the said member is a stop arm associated with a spring deflected by the out-of-balance load during approximate weighing, clamping means being provided to retain the said stop arm in any position to which it is deflected and the said stop arm acting as a stop for a driving member acting on the weight-selecting device so that the position to which that device is driven depends on the position of the stop arm.

The invention is hereinafter described with reference to the accompanying drawings, in which.

Figure 1:
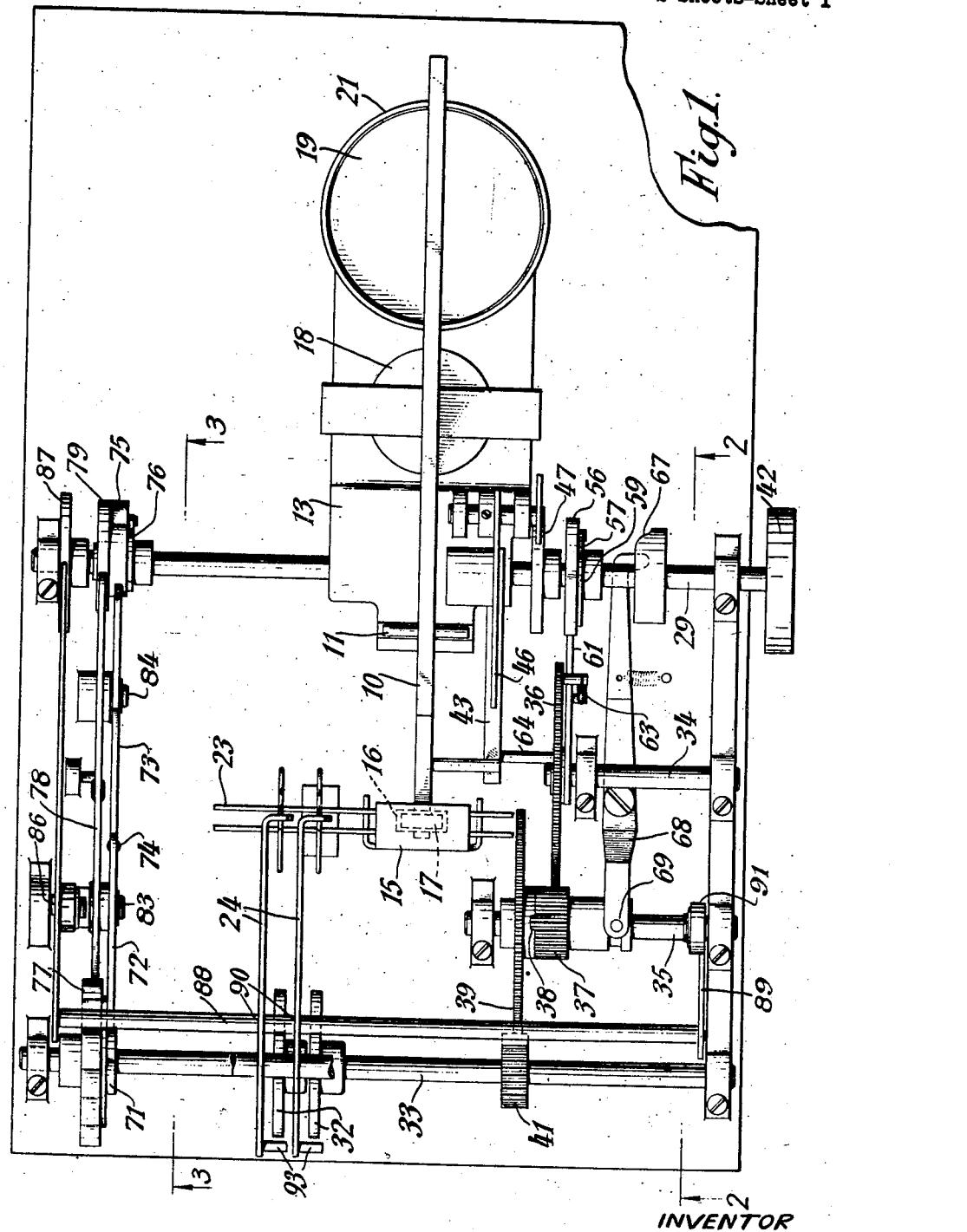
FIGURE 1 is a diagrammatic plan view of one form of balance embodying the invention, the balance, which is described by way of example, being of the two-knife-edge constant-load type.

Referring to the drawings, the balance beam 10 (FIGURES 1 and 2) pivots for weighing purposes about a knife edge 11 resting on a pad 12 carried by a supporting frame 13. A scale pan 14 is suspended from one end of the balance beam by a suspension member 15 carrying at its upper end a downwardly-facing pad 16 adapted to rest on a knife-edge 17 mounted at one end of the beam 10. At the opposite side of the knife edge 11 the beam carries a counterweight 18 and a piston 19 movable in a cylinder 21 carried by the frame 13 to damp the movements of the beam in the known manner. The beam also carries a graticule or other scale 22 associated with optical means, not shown, to provide a visual indication of the position of the beam 10. A weight carrier 23 mounted on the suspension member 15 normally supports a group of weights acting in opposition to the counterweight 18, the weights being removable individually from the carrier 23 by arms 24 to achieve a condition in which the remaining weights plus the sample 25 on the scale pan 14 just balance the counterweight 18.

An arrestment frame 26 (shown only in FIGURE 2) is provided to support the beam 10 and separate off the knife edge 11 from the pad 12 when the balance is not in use, and also to lift the pad 16 on the suspension member 15 clear of the knife edge 17. The arrestment frame 26 is carried by a stem 27 slidable vertically in guides 28 and is moved up and down by a cam (not shown) on an arrestment shaft 29 to arrest and release the beam 10.

The arms 24 which remove the weights from the weight carrier are all pivoted on a shaft 31 and co-operate with cams 32 on a weight-selecting shaft 33 in such a manner that progressive turning of the shaft from a position in which all the weights are on the carrier predetermines the removal of a progressively increasing proportion of the total weight from the said carrier.

A lever 85 pivoted on a shaft 86 bears at one end on a cam 87 on the arrestment shaft 29 and carries at its other end a bar 88 extending beneath the arms 24 to a lever 89 pivoted on a shaft 91. The cam 87 is so shaped that in the arrested position and the approximate weighing position the bar presses against the arms 24 at 90 to move follower pins 93 thereon clear of their cams 32. When the balance is released for fine weighing the bar is moved by the cam 87 so that the follower pins on the arms 24 may move into contact with their cams 32 under the action of springs 92, and thus lift off weights as determined by the position of the weight-selecting shaft 33.

The arrestment shaft 29 and the weight-selecting shaft are arranged parallel one to the other and between and parallel to them are mounted two other shafts 34 and 35 hereinafter referred to respectively as the driving shaft and the clutch shaft. A driving gear 36, driven as hereinafter described by the arrestment shaft, and mounted on the shaft 34, meshes with a smaller gear 37 on the clutch shaft, the said smaller gear transmitting rotation through a clutch 38 to another larger gear 39 on the same shaft, the gear 39 also meshing with a smaller gear 41 on the weight-selecting shaft 33.

The arrestment shaft 29 is movable through a total angle of 180° and, at the centre of its arc of movement, the arrestment frame is lifted to its maximum position to arrest the balance beam 10. The shaft 29 is turned by means of a knob 42 (FIGURE 1) and turning it clockwise from the central position as viewed in FIGURE 2 releases the beam 10 for fine weighing, whilst turning it anticlockwise from the central position releases the beam for approximate weighing.

A blade spring 43 fixed to the supporting frame 13 at 44 is arranged to bear upwardly on a knife edge 45 on the beam 10 when the said beam is released for approximate weighing. At this time all of the removable weights are supported by the weight carrier, so that, with a sample on the scale pan, there is an excess of weight on the end of the beam carrying the scale pan, and the spring 43 is deflected. When the beam 10 is released for fine weighing a bell-crank lever 46 pivoted on the supporting frame 13 is moved by a cam 47 on the arrestment shaft to press downwardly on the blade spring 43 and hold it away from the knife edge 45, so that the said spring 43 has no effect on the beam.

Figure 4:
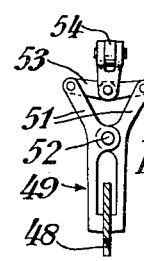
FIGURE 4 is a detail sectional view along the line 4—4 of FIGURE 2.

Fixed to the free end of the blade spring 43 is a stop arm 48, the position of which, during an approximate weighing operation, is determined by the deflection of the said blade spring. A clamp 49, shown in detail in FIGURE 4, is closed during the initial stages of the return of the arrestment shaft to the arrested position to hold the stop arm 48 in the position to which it is set during approximate weighing, the clamp 49, which comprises two limbs 51 pivoted together at 52 and adapted to grip the stop arm between them at one end by extension of a toggle linkage 53 between their other ends, being actuated by a bell-crank lever 54 actuated by a cam 55 on the arrestment shaft. The cam 55 is so arranged on the arrestment shaft 29 that it is rotated by that shaft only when the latter is turned clockwise from the approximate weighing position to the fine weighing position, the one-way driving means being similar to those described below for another cam. The cam lobes which close the clamp are so positioned on the cam 55 that the clamp 49 is closed only during movement of the arrestment shaft 29 from the approximate weighing position back towards the arrestment position.

Figure 2:
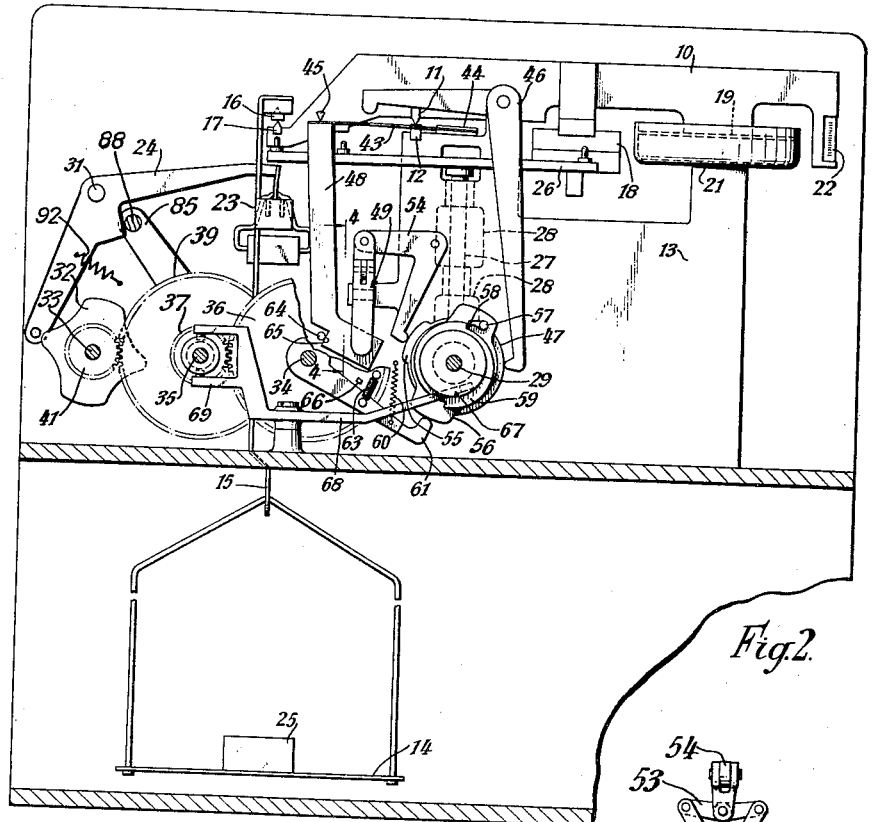
FIGURE 2 is a vertical section on the line 2—2 of FIGURE 1 showing the beam and some parts of the other mechanism of the balance.

A cam 56 on the arrestment shaft, similar to the cam 55 is, as shown in FIGURE 2, driven from the said arrestment shaft by means of a pawl 57 on the cam member engaging with either one of two ratchet teeth 58 on a disc 59 fixed to the arrestment shaft 29, the arrangement being such that the cam is driven only in a clockwise direction. A driving arm 61 pivoted on the shaft 34 co-operates with lobes on the cam 56 in such a way that it is moved clockwise during each movement of the arrestment shaft from the approximate weighing position to the arrested position, and whilst the clamp is operative. The arm 61 is coupled to the driving gear 36 by a coupling spring 63 which tends to cause the said gear to rotate with the arm, driving, through the gear train 36, 37, 39, 41, and through the clutch 38, the weight-selecting shaft 33. A pin 64 mounted eccentrically on the driving gear 36 has a path of movement such that at a point in the rotation of the gear 36 depending on the position of the stop arm 48, it comes up against an abutment 65 on the said stop arm, so that the latter determines the position to which the weight-selecting shaft 33 is moved and so determines what weights are to be lifted off the weight carrier 23. The arm 61 makes a movement which is always of the same magnitude during movement of the arrestment shaft from the approximate weighing to the arrestment position. The spring 63 causes the gear 36 to rotate as the arm 61 moves until the pin 64 engages the surface 65 of the arm 48, the position of the surface 65 depending on the deflection of the approximate weighing spring 43. The gear 36 drives the shaft 33 and the setting cams thereon. Depending on the setting of the automatic weighing spring 43 and consequently on the position of the stop arm 48, the gear 36 stops its rotation when the pin 64 engages the surface 65 and the arm 61 completes its movement alone tensioning the spring 63. Consequently, the position of the shaft 33 and of the cams depends on the setting of the approximate weighing spring. The initial position of the arm 61 is determined by a return spring 60 urging the said arm towards the cam 56 and the driving gear 36 is positioned relative to the arm 61 by an abutment 66 on the driving gear against which the arm is urged by the spring 63.

The clutch 38 is released to permit the weight-selecting shaft to be returned to its normal position in which all the weights are selected to act on the carrier 23 (called, for convenience, its zero position) by a face cam 67 on the arrestment shaft 29, acting through a lever 68 having a forked end 69 with pins engaging in a circumferential groove in one of the clutch elements. The face cam 67 is so positioned on the arrestment shaft that the clutch 38 is engaged only during the turning of the gear 36 by means of the arm 61.

Figure 3:
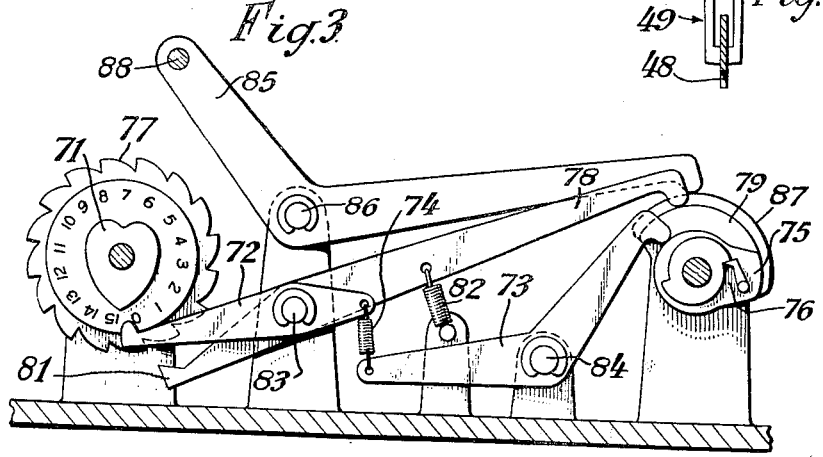
FIGURE 3 is a vertical section on the line 3—3 of FIGURE 1 showing other parts of the mechanism.

The zeroising mechanism as shown in FIGURES 1 and 3 comprises a heart-shaped cam 71 fixed on the weight-selecting shaft, a two-armed lever 72 pivoted on the shaft 83, a second two-armed lever 73 pivoted on the shaft 84, a tension spring 74 connecting the two levers, and a cam 75 acting on the lever 73, the cam 75 being driven by means of ratchet mechanism 76 similar to that already described in such a way that, during the initial stages of movement of the arrestment shaft 29 from the arrested position towards the approximate weighing position one end of the lever 72 is pressed against the edge of the heart-shaped cam 71 to rotate the weight-selecting shaft to its zero position.

There is also provided on the weight-selecting shaft 33 a toothed wheel 77 having a number of teeth equal to the number of different weight values capable of being selected. A two-armed lever 78 pivoted on the shaft 83, and having one end engaging an edge cam 79 on the arrestment shaft 29 has at its other end a detent 81 to engage the toothed wheel 77, the cam 79 being so shaped that the detent disengages the toothed wheel 77 just as the arrestment shaft moves away from the arrested position towards the approximate weighing position and remains disengaged until the said shaft nearly reaches the arrested position on its return movement. A spring 82 acting on the lever 78 urges it into engagement with the toothed wheel when the said lever is released by the cam 79.

The sequence of operations as the arrestment shaft 29 is turned towards the approximate weighing position is that the detent 81 is disengaged from the toothed wheel 77 on the weight-selecting shaft 33 then the zeroising lever 72 acts on the heart-shaped cam 71 to zeroise the weight-selecting shaft 33. The balance beam 10 is then released and the approximate weigher spring 43 is deflected, the stop arm 48 moving with it. The arrestment shaft 29 has now reached the approximate weighing position. On return movement, the clamp 49 is engaged to hold the stop arm 48 against movement, the clutch 38 is engaged, and the driving arm 61 is driven by its cam to apply torque to the driving wheel 36 and drive the weight-selecting shaft 33 through the clutch and clearing. The distance through which the said shaft is driven depends on the position of the stop arm 48, the pin 64 on the driving wheel 36 engaging the said stop arm 48 to arrest rotation of the wheel, and the arm 61, during the remainder of its stroke, extending the coupling spring 63. The gearing 36, 37, 39, 41 multiplies the movement of the arrestment shaft so that the weight-selecting shaft can make a complete revolution for only a relatively small angular movement of the arrestment shaft. As the latter shaft approaches the arrested position the detent 81 re-engages the toothed wheel 77 and the clutch 38 and clamp 49 are released. The shape of the teeth on the toothed wheel 77 is such that the detent 81 holds the wheel in any one of a plurality of predetermined positions corresponding to specific weights and, if the shaft stops between two specific weight positions, rotates it to the position for selecting the next lower weight.

The arrestment shaft 29 is next turned to the fine weighing position, moving the bar 88 and allowing the selected weights to be lifted off the weight carrier 23 and releasing the beam 10. The approximate weighing spring 43 is at the same time deflected out of the range of movement of the beam 10 by the lever 46. The graticule or other indicator 22 shows the degree of unbalance, and if the deflection when the beam comes to rest is within the range of the indicator, the weight of the article can be read directly, but if not small weights may be necessary to bring the reading on to the scale.

The return of the arrestment shaft 29 to the arrested position after a fine weighing operation loads the spring acting on the lever 72 bearing on the heart-shaped cam 71 ready for zeroising the weight-selecting shaft during the next approximate weighing operation, and returns the bar 88 to the position where the arms 24 are out of contact with their cams 32.

The actual mechanism for selecting and manipulating the weights, and the arrestment mechanism of the balance, may be of any known type, and do not form any part of the present invention.

I claim:

1. In a weighing balance the combination with a balance beam, a sample pan, means for weighing a sample in said pan by the removal of counterweights, a weight selecting mechanism, means for counter-balancing a sample placed in said pan, including a blade spring operatively connected to the balance beam wherein the deflection of the spring and beam increases until the said beam reaches a position at which the weight of said sample is balanced by the load of said spring which is then deflected to a degree proportional to the weight of said sample, the angle of said deflection of said beam determining the position of a control means, said last-named means controlling the weight selecting mechanism for selecting the appropriate weights whereby the balance beam is substantially balanced.

2. In a weighing balance the combination of a balance beam, a sample pan, means for weighing the sample in said pan by the selection of weights, a weight selecting mechanism means for counter-balancing a sample placed in said pan, including a spring operatively connected to the balance beam, wherein the deflection of the spring and beam increases until the said beam reaches a position at which the weight of said sample is balanced by the load of said spring which is then deflected to a degree proportional to the weight of said sample, means carried by said spring and brought into position by said deflection, the said position being determined by the extent of deflection, the position of said last-named means controlling the weight-selecting mechanism to effect a control of the selection of weights whereby the balance beam is substantially balanced.

3. The weighing balance according to claim 2, wherein clamping means are employed to clamp and hold the said means carried by the spring in said position at the completion of approximate weighing.

4. The weighing balance according to claim 2, wherein the spring is a blade spring with one end in detachable engagement with the balance beam and wherein means are employed to detach the spring from said balance beam during fine weighing.

5. The weighing balance according to claim 2, wherein the means carried by the spring is a stop arm adapted to contact and stop the weight-selecting mechanism to control the selection of weights thereby.

References Cited by the Examiner

UNITED STATES PATENTS

| | | | |
|---|---|---|---|
| 2,812,172 | 11/57 | Whitcroft et al. | 177—2 |
| 3,026,954 | 3/62 | Appius | 177—248 |
| 3,047,083 | 7/62 | Chyo | 177—150 |
| 3,055,444 | 9/62 | Chyo | 177—191 |

LEO SMILOW, *Primary Examiner.*